(12) United States Patent
Tremmel et al.

(10) Patent No.: US 9,175,714 B2
(45) Date of Patent: Nov. 3, 2015

(54) PLUG-IN NUT

(75) Inventors: Günter Tremmel, Lörrach (DE); Ingo Hauser, Kandern (DE); Christian Kolb, Binzen (DE); Jan Regensburger, Kandern (DE)

(73) Assignee: A. Raymond et Cie, Grenoble (FR)

( * ) Notice: Subject to any disclaimer, the term of this patent is extended or adjusted under 35 U.S.C. 154(b) by 67 days.

(21) Appl. No.: 14/111,575

(22) PCT Filed: Mar. 30, 2012

(86) PCT No.: PCT/EP2012/055893
§ 371 (c)(1),
(2), (4) Date: Nov. 19, 2013

(87) PCT Pub. No.: WO2012/139909
PCT Pub. Date: Oct. 18, 2012

(65) Prior Publication Data
US 2014/0064874 A1    Mar. 6, 2014

(30) Foreign Application Priority Data

Apr. 15, 2011  (DE) .......................... 10 2011 017 154
Jul. 6, 2011  (DE) ..................... 20 2011 102 954 U

(51) Int. Cl.
*F16B 37/04*     (2006.01)
*F16B 13/00*     (2006.01)
*F16B 37/00*     (2006.01)

(52) U.S. Cl.
CPC ............... *F16B 37/04* (2013.01); *F16B 37/043* (2013.01); *F16B 37/044* (2013.01); *F16B 13/001* (2013.01); *F16B 37/005* (2013.01); *F16B 2013/006* (2013.01)

(58) Field of Classification Search
CPC ............................ F16B 37/043; F16B 37/044
USPC .................................................. 411/182, 21
See application file for complete search history.

(56) References Cited

U.S. PATENT DOCUMENTS

| 2,404,169 | A   | 7/1946 | Gidden |
| 3,877,342 | A   | 4/1975 | Duchatellier |
| 4,284,378 | A * | 8/1981 | Mizusawa ........................ 411/21 |

(Continued)

FOREIGN PATENT DOCUMENTS

| DE | 9422050 U1  | 10/1997 |
| DE | 19930728 A1 |  2/2001 |

(Continued)

OTHER PUBLICATIONS

International Search Report and Written Opinion mailed Jun. 22, 2012 from the International Searching Authority and its English translation.

*Primary Examiner* — Flemming Saether
(74) *Attorney, Agent, or Firm* — Faegre Baker Daniels LLP

(57) ABSTRACT

A plug-in nut has an outer body and an inner body which is mounted in the outer body such that it can be displaced in a rotationally fixed manner. On the inner body, rear-latching lugs are formed on spring arms, which rear-latching lugs fix an attachment component on a carrier part in a variable position of the inner body in relation to the outer body, which variable position is assumed so as to compensate for tolerances, as soon as a screw has been screwed into a screw receiving space of the inner body. This results in a secure hold with very simple handling.

10 Claims, 8 Drawing Sheets

(56) References Cited

U.S. PATENT DOCUMENTS

| | | | |
|---|---|---|---|
| 4,553,889 A | 11/1985 | Le Dantec et al. | |
| 4,743,152 A * | 5/1988 | Nakayama et al. | 411/182 |
| 5,173,025 A | 12/1992 | Asami | |
| 5,314,280 A * | 5/1994 | Gagliardi et al. | 411/182 |
| 5,401,132 A * | 3/1995 | Akema | 411/38 |
| 6,059,502 A | 5/2000 | Konig et al. | |
| 6,315,510 B1 | 11/2001 | Sturies et al. | |
| 6,322,305 B1 | 11/2001 | Bantle | |
| 6,435,790 B1 | 8/2002 | Ichikawa | |
| 7,018,153 B2 * | 3/2006 | Behle et al. | 411/182 |
| 8,132,435 B2 * | 3/2012 | Thomas et al. | 70/95 |
| 8,591,160 B2 * | 11/2013 | Shinozaki | 411/347 |
| 2010/0119325 A1 * | 5/2010 | Edland | 411/182 |
| 2012/0131772 A1 | 5/2012 | Hofmann | |

FOREIGN PATENT DOCUMENTS

| | | |
|---|---|---|
| DE | 102009030040 A1 | 12/2010 |
| EP | 0681110 B1 | 11/1995 |
| WO | WO87/01419 A1 | 3/1987 |
| WO | WO2009/109268 A1 | 9/2009 |
| WO | WO02011/043355 A1 | 4/2011 |

* cited by examiner

PLUG-IN NUT

CROSS-REFERENCE TO RELATED APPLICATIONS

This application is a U.S. National Phase Patent Application based on International Application No. PCT/EP2012/055893 filed Mar. 30, 2012, which claims priority to German Patent Application No. 10 2011 017 154.1 filed Apr. 15, 2011 and German Patent Application No. 20 2011 102 954.2 filed Jul. 6, 2011, the entire disclosures of which are hereby explicitly incorporated by reference herein.

BACKGROUND OF THE INVENTION

1. Field of the Invention

The present invention relates to a plug-in nut.

2. Description of the Related Art

A plug-in nut of this kind is known from DE 10 2005 032 699 A1. The prior plug-in nut has an outer body configured with a support plate and receiving slots. Also present is an inner body, which is mounted in the outer body such that it can be displaced over a displacement path. The inner body is formed with a screw receiving space into which a screw can be screwed, and comprises rear-locking catch lugs that protrude radially outward beyond the outer body and that in a final mounted arrangement, after the inner body has been rotated relative to the outer body from a preliminary mounted arrangement, are disposed in the receiving slots of the outer body. In the preliminary mounted position, the inner body is rotated relative to the outer body so that the rear-locking catch lugs are aligned with a base portion of the outer body, to enable the prior plug-in nut to be fitted into a receiving opening formed in a carrier part. The axial displaceability of the inner body relative to the outer body makes it possible to compensate for tolerances.

SUMMARY OF THE INVENTION

The present invention provides a plug-in nut which is distinguished by relatively simple, robust construction that makes for reliable handling in large-scale use.

Because the inner body is rotationally fixedly mounted in the outer body in the plug-in nut according to the invention, rotational movement of the inner body relative to the outer body is prevented.

Because the rear-locking catch lugs are formed on radially movable spring arms, the plug-in nut can be inserted, as the spring arms deflect, into a receiving opening of at least one carrier part and also optionally into a receiving opening of an add-on part, the rear-locking catch lugs themselves being guided in receiving slots for reasons of stability and thus being locked against being diverted in a circumferential direction, as a complement to the rotational locking of the inner body relative to the outer body, with commensurate reliability of handling in large-scale use.

In one form thereof, the present invention provides a plug-in nut having a support plate and an outer body that is provided with receiving slots, and having an inner body that is mounted in the outer body displaceably over a displacement path and is provided with a screw receiving space into which a screw can be screwed and is configured with rear-locking catch lugs that protrude radially outward beyond the outer body and in a final mounted arrangement are disposed in the receiving slots of the outer body, characterized in that the inner body is rotationally fixedly mounted in the outer body, each rear-locking catch lug being formed on a spring arm that is flexible in the radial direction and being disposed in an assigned guide slot over the entire displacement path.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
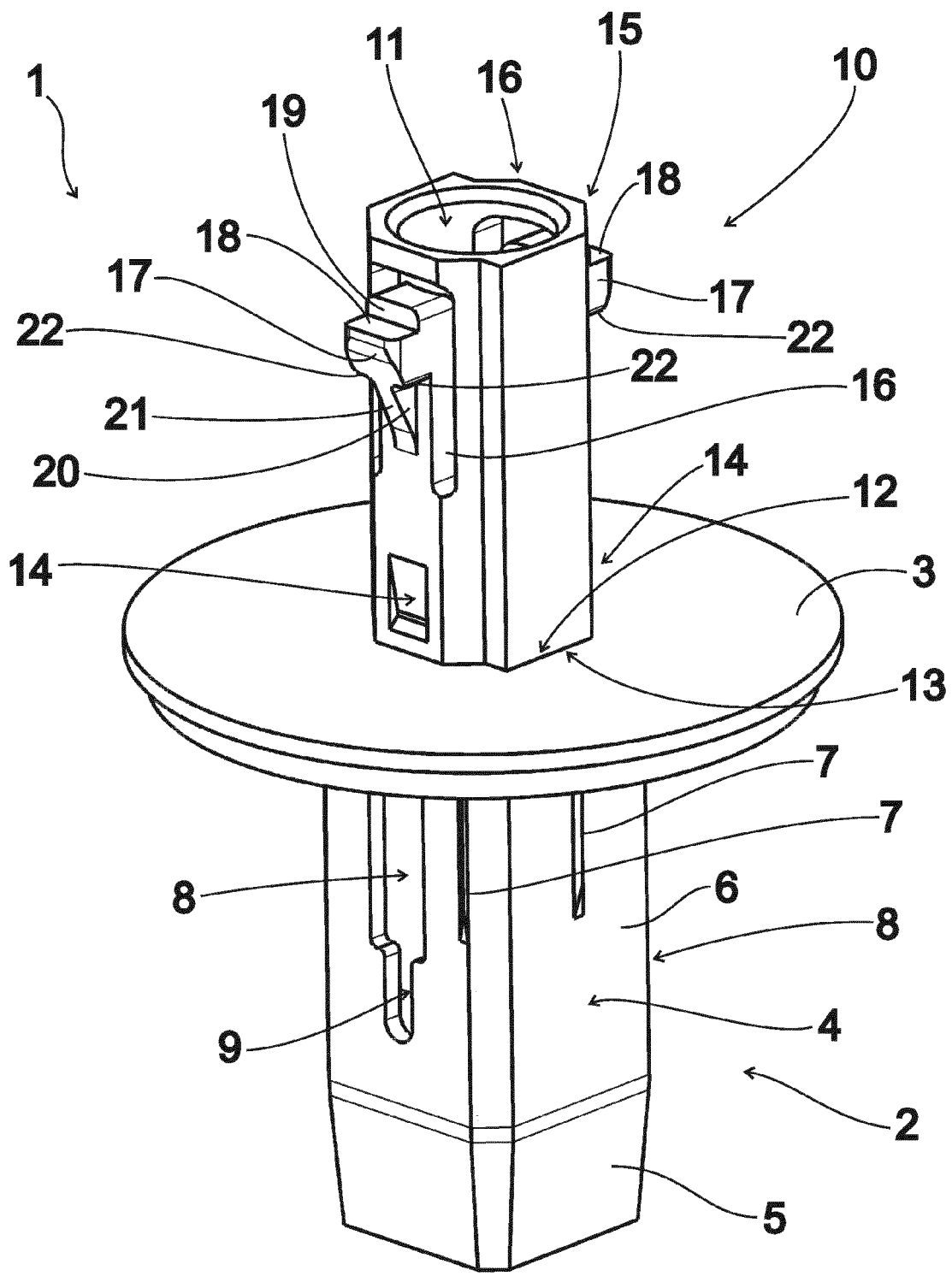
FIG. 1 is a perspective view of an exemplary embodiment of a plug-in nut according to the invention, having an outer body and an inner body, which is pushed partway into the outer body.

Corresponding reference characters indicate corresponding parts throughout the several views. Although the exemplifications set out herein illustrate embodiments of the invention, in several forms, the embodiments disclosed below are not intended to be exhaustive or to be construed as limiting the scope of the invention to the precise forms disclosed.

DETAILED DESCRIPTION

FIG. 1 is a perspective view of an exemplary embodiment of a plug-in nut 1 according to the invention, made from a hard-elastic synthetic material. The plug-in nut 1 comprises an outer body 2 having a support plate 3 and an elongate foot shaft 4 that is connected to the support plate 3 and is oriented substantially perpendicular to the support plate 3, which extends radially outward, collar-like, beyond the foot shaft 4. In this exemplary embodiment, the foot shaft 4 is formed with an essentially square outer cross section and tapers in a foot portion 5 remote from the support plate 3. A middle portion 6 situated between the support plate 3 and the foot portion 5 has a cross section that is constant in the longitudinal direction and is configured in its region proximate the support plate 3 with compensating ribs 7 that extend in the longitudinal direction and protrude slightly beyond the outer wall of the outer body 2. Provided in two opposite walls of the middle portion 6 are elongate receiving slots 8 extending in the longitudinal direction, which in their end portions 9 proximate the foot portion 5 are tapered relative to the rest of the width.

The plug-in nut 1 is also equipped with an elongate inner body 10 having a cross section that deviates from a circular shape, here formed with flat side faces oriented at angles to each other. The inner body 10 is provided with a screw receiving space 11 extending in the longitudinal direction. In the representation according to FIG. 1, the inner body 10 is inserted by a smooth-walled edge portion 12 into a receiving opening 13 provided in the support plate 3 and having a form-locking cross section complementary to the cross section of the inner body 10. In the region of the edge portion 12, the inner body 10 is configured with at least one, but preferably two mutually oppositely disposed fixing recesses 14.

Disposed on the side of the fixing recesses 14 facing away from edge portion 12 are spring arms 16, cut from a head portion 15 of inner body 10, which are flexible in the radial direction and each of which carries a rear-locking catch lug 17 at its free end proximate the head portion 15. In a relaxed arrangement, the rear-locking catch lugs 17 protrude radially outward beyond the outer wall of the inner body 10 and beyond the middle portion 6 of the outer body 2 and each comprise a respective axial stop face 18 that faces away from edge portion 12 and thus toward head portion 15, together with a respective radial stop face 19 oriented at right angles to the axial stop face 18. Formed on each spring arm 16 and each rear-locking catch lug 17, on the side facing away from the axial stop face 18, is a respective wedge-shaped rib 20 that is narrower than the rear-locking catch lug 17 and extends in the longitudinal direction, from an end proximate a fixing recess, with increasing radial distance from the respective spring arm 16, toward the particular rear-locking catch lug 17, and comprises a ramp face 21 that is disposed flush with the rear-locking catch lug 17. Each rear-locking catch lug 17 has boundary surfaces 22 disposed on both sides of the wedge-shaped ribs 20, oppositely from the particular axial stop face 18.

Figure 2:
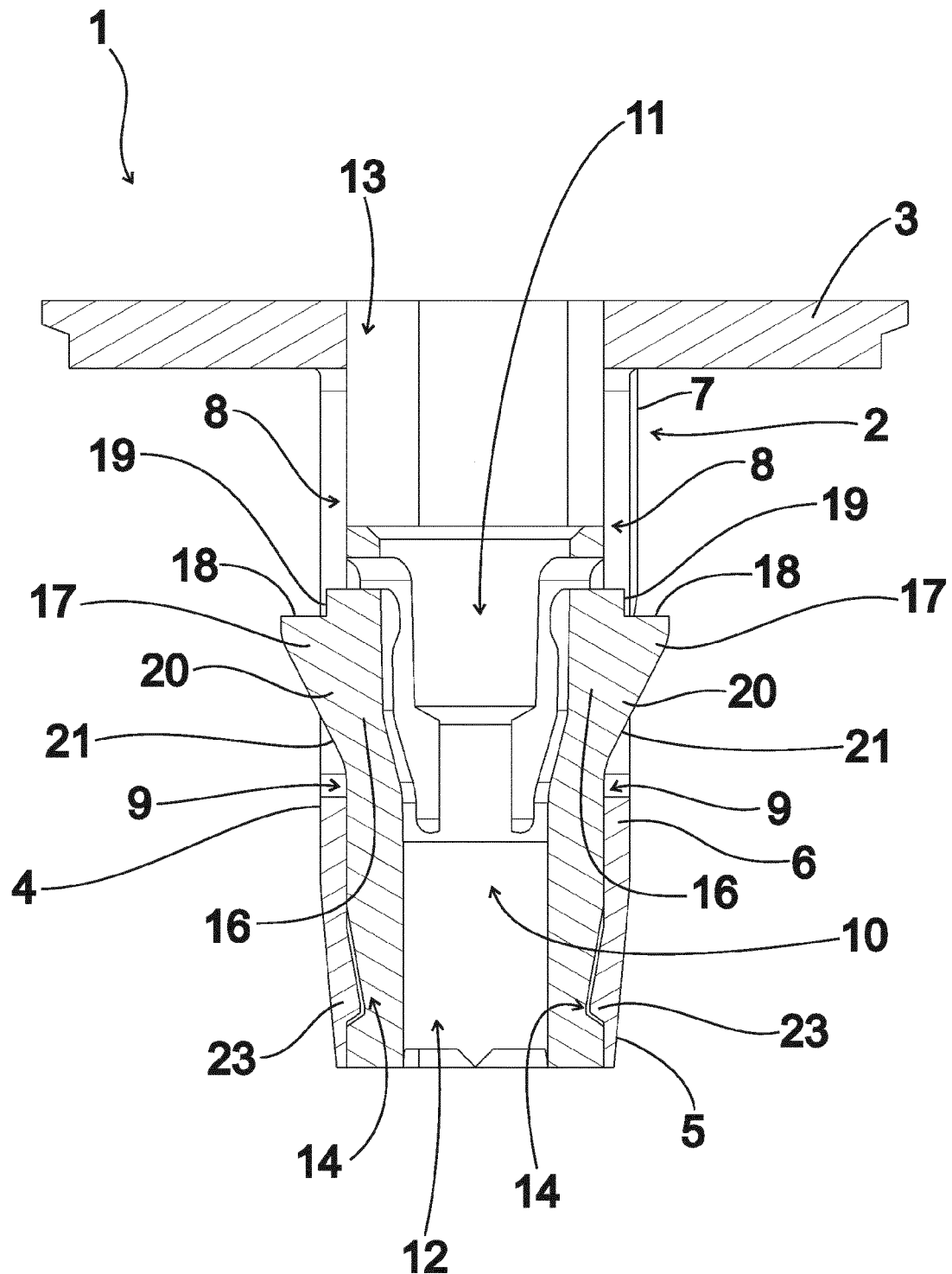
FIG. 2 is a longitudinal section of the exemplary embodiment according to FIG. 1, with an inner body pushed into the outer body to a final position.

FIG. 2 shows the exemplary embodiment according to FIG. 1 in longitudinal section, with an inner body 10 pushed all the way into the outer body 2 to a final position. It is evident from the representation according to FIG. 2 that in the final position, fixing projections 23 formed in the foot portion 5 of outer body 2 engage in the fixing recesses 14 of inner body 10 and form, together with the fixing recesses 14, engaging means for fixing the inner body 10 in the outer body 2 so that it remains secure up to a preliminary mounting force that is smaller than the extraction force of the plug-in nut. It can also be seen from FIG. 2 that in this arrangement of the inner body 10 where it is pushed farther into the outer body 2 than in the arrangement of FIG. 1, the rear-locking catch lugs 17 are now disposed in the receiving slots 8; to assume the arrangement according to FIG. 2, the rear-locking catch lugs 17, on passing through the receiving opening 13 in the region of the support plate 3, were deflected radially inward due to the flexibility of the spring arms 16 as the ramp faces 21 slid past the edge of the receiving opening 13. In the arrangement according to FIG. 2, the wedge-shaped ribs 20 are inserted in the end portions 9 of the receiving slots 8, whereupon the boundary surfaces 22 come into abutment against steps of the receiving slots 8 formed in the region of the end portions 9 and block further insertion of the inner body 10 into the outer body 2.

Figure 3:
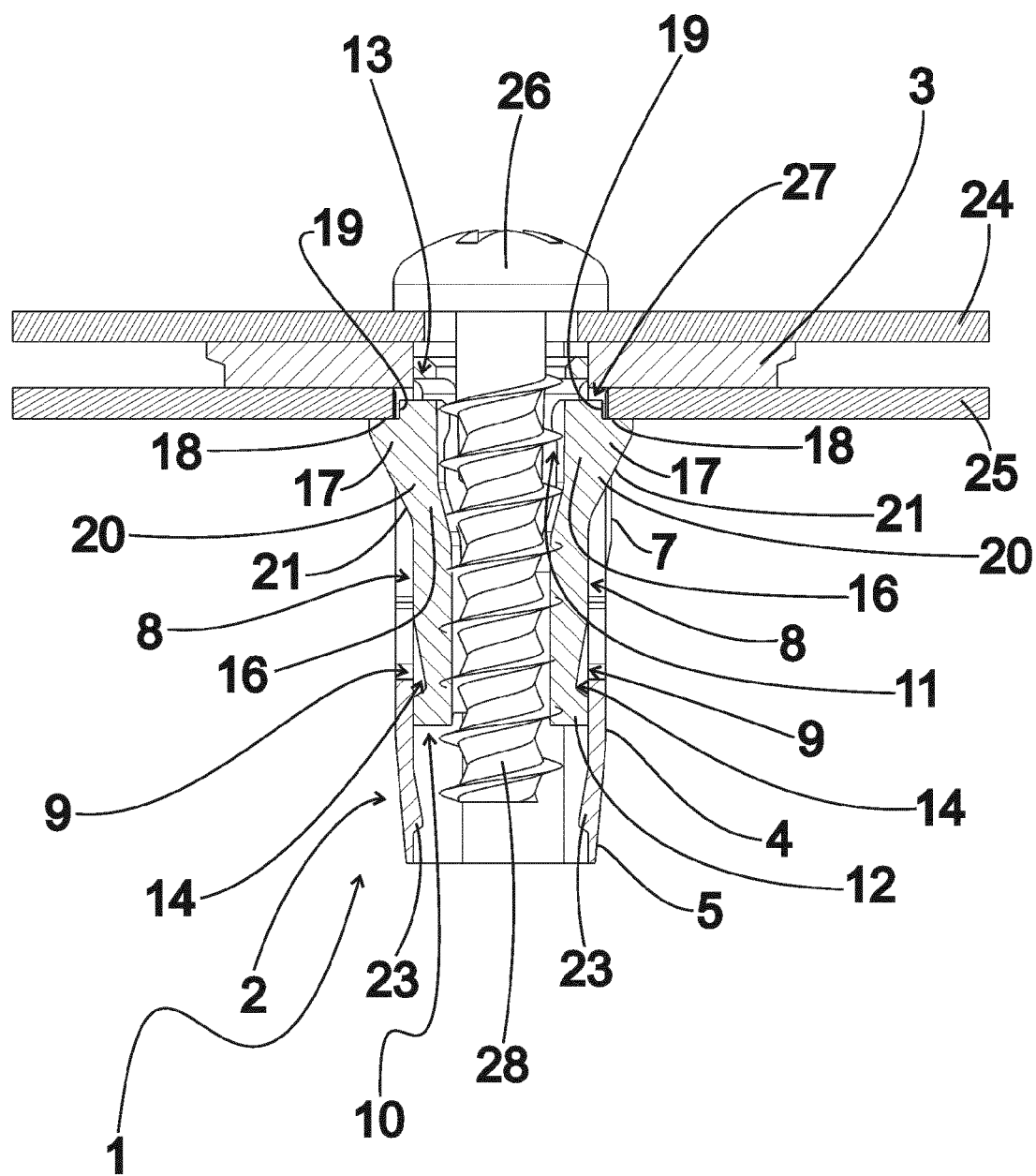
FIG. 3 is a longitudinal section of the exemplary embodiment according to FIG. 1 in a final mounted arrangement in which an add-on part is fastened to a carrier part.

FIG. 3 is a longitudinal section of the exemplary embodiment according to FIG. 1 in a final mounted arrangement, showing the attachment of an add-on part 24 to a carrier part 25 by means of a screw 26. To assume the final mounted arrangement according to FIG. 3, the plug-in nut 1 was inserted into a fastening opening 27 formed in the carrier part 25; as in the assumption of the final position described in connection with FIG. 2, during the insertion process the spring arms 16 are deflected radially inward sufficiently so that the rear-locking catch lugs 17 are sunk all the way into the receiving slots 8 as the edge of the fastening opening 27 slides up the ramp faces 21 of the wedge-shaped ribs 20. Due to the engagement of the fixing recesses 14 and the fixing projections 23, during the operation of inserting the plug-in nut 1 the inner body 10 remains in the arrangement of being inserted all the way into the outer body 2, as illustrated in FIG. 2, up to a preliminary mounting force that is greater than the oppositely directed force exerted by the forcible deflection of the spring arms 16.

Once the support plate 3 was in abutment with the carrier part 25, the add-on part 24 was placed on the support plate 3, on the side of the support plate 3 facing away from the carrier part 25, and the screw 26 was pushed all the way through the receiving opening 13 into the outer body 2 until the end of a screw shaft 28 of the screw 26 was partway inside the screw receiving space 11 of the inner body 10. After the screw 26 is turned by means of a tool not shown in FIG. 3, a thread of the screw shaft 28 comes into engagement with the inner wall of the inner body 10 and releases the engagement between the fixing recesses 14 and the fixing projections 23.

As the operation of tightening the screw continues, the inner body 10, by virtue of its displaceable mounting in the outer body 2, moves over a displacement path until it comes into abutment with the axial stop faces 18 of the rear-locking catch lugs 17 on the side of the carrier part 25 facing away from the support plate 3. In this arrangement, the spring arms 16 are blocked against deflecting inward by the screw shaft 28, while the radial stop faces 19 prevent the spring arms 16 from moving radially outward by butting against the inner face of the fastening opening 27. This ensures secure retention of the plug-in nut 1, with a very high extraction force.

Figure 4:
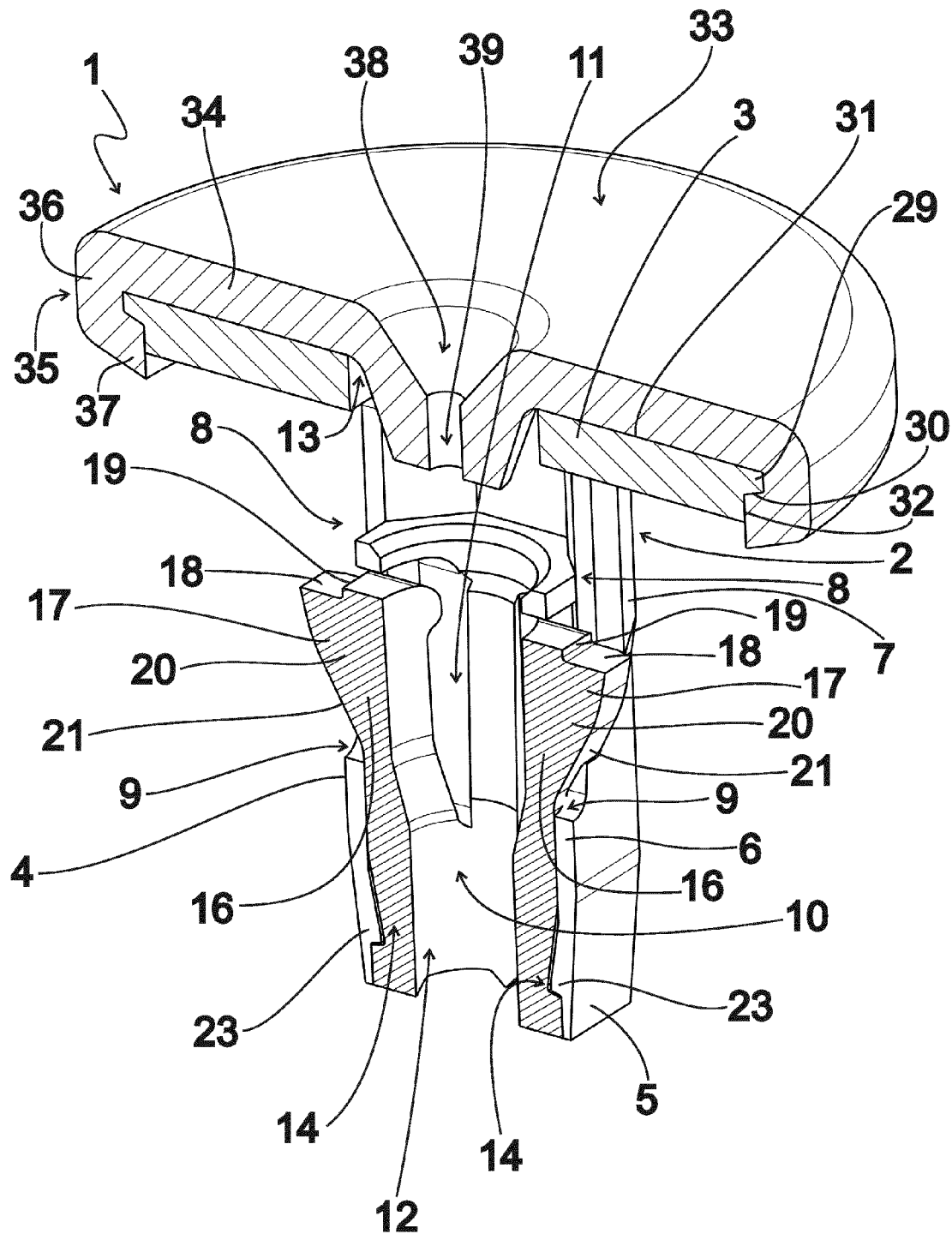
FIG. 4 is a partially cut-away perspective view of a further exemplary embodiment of a plug-in nut according to the invention, comprising a sealing cap.

FIG. 4 is a partially cut-away view of a further exemplary embodiment of a plug-in nut according to the invention, having an outer body 2 and an inner body 10 shaped and constructed similarly to the exemplary embodiment described with reference to FIGS. 1 to 3. Thus, to avoid repetition, mutually corresponding elements in the exemplary embodiment according to FIGS. 1 to 3 and the exemplary embodiment according to FIG. 4 are provided with the same reference numerals and will not be described in more detail. In the further exemplary embodiment according to FIG. 4, the support plate 3 is configured at its edge side with a radially outwardly projecting plate collar 29, which on its side facing toward the foot shaft 4 of the outer body 2 is configured with a chamfer 30 that slopes away from the radial outer face of the plate collar 29 toward the foot shaft 4, and thus away from a top cover side 31 of the support plate 3. At the radially inwardly disposed end of the chamfer 30, the support plate 3 has an annular face 32 oriented parallel to the longitudinal direction of the foot shaft 4.

The further exemplary embodiment according to FIG. 4 is also provided with a top cover 33 made of a soft-elastic synthetic material, which is preferably fabricated as a separate component and is mounted on the support plate 3, as illustrated in FIG. 4, in an assembly step. The top cover 33 comprises a top cover plate 34 whose base area corresponds to the base area of the support plate 3. At the radial outer side of the top cover plate 34, the top cover 33 is configured with an inwardly directed collar 35 having an edge portion 36 that radially outwardly surrounds the plate collar 29, and an inner portion 37 that extends radially inwardly from the end of the edge portion 36 remote from the top cover plate 34. The distance between the top cover plate 34 and inner portion 37 is so adapted that, as can be clearly seen in FIG. 4, the plate collar 29 of the support plate 3 fits form-lockingly therein. As a result, the inner side of inner portion 37, facing toward the top cover plate 34, rests against the chamfer 30. The dimension of inner portion 37 in the radial direction is so adapted that the radially inwardly directed end of inner portion 37 rests against the annular face 32 of the support plate 3. The top cover 33 thus surrounds the support plate 3 on the side thereof facing away from foot shaft 4 and in the region of the radial outer side. It can also be understood from the representation of FIG. 4 that in the relaxed arrangement of the top cover 33, as depicted in FIG. 4, inner portion 37 extends past the support plate 3 in the axial direction, toward the foot shaft 4.

In the exemplary embodiment according to FIG. 4, the top cover plate 34 is configured with a central well 38 that extends into the receiving opening 13. In the further exemplary embodiment depicted in FIG. 4, the well 38 is formed with an opening 39 whose diameter is dimensioned to be approximately half the nominal diameter of a screw shaft 28 of a screw 26 that is to be used with the plug-in nut 1.

Figure 5:
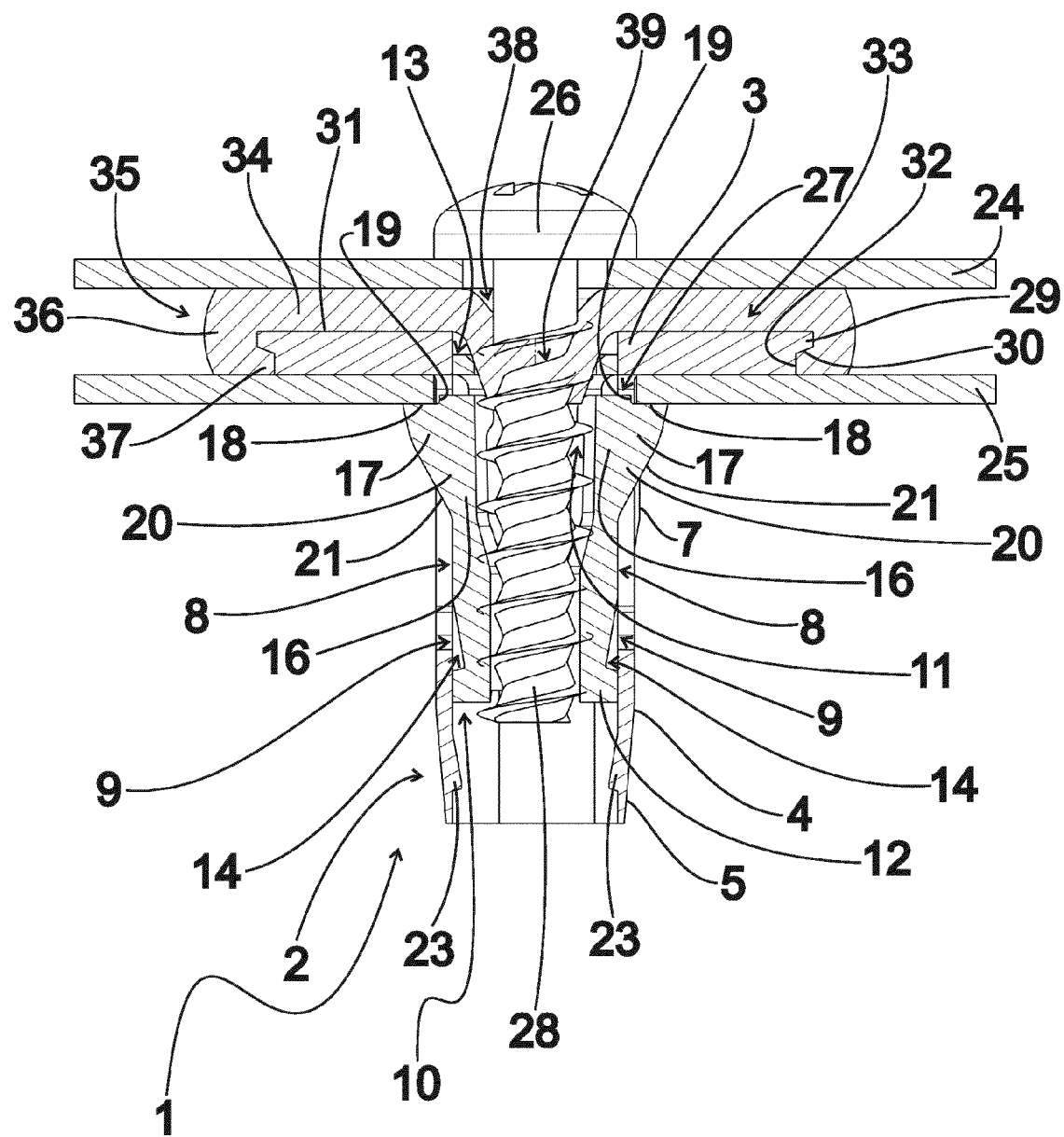
FIG. 5 is a longitudinal section of the further exemplary embodiment according to FIG. 4 in a final mounted arrangement with a pressed sealing cap.

FIG. 5 is a longitudinal section of the further exemplary embodiment according to FIG. 4 in a final mounted arrangement in which the top cover 33 is pressed, particularly by its inner portion 37, between an add-on part 24 and a carrier part 25 by the tightening of a screw 26, the inner body 10 simultaneously being pressed against the carrier part 25 as explained in connection with FIG. 3 concerning the exemplary embodiment of FIG. 1. The pressing of the top cover 33 and the surrounding of the screw shaft 28 in the region of the well 38 results in extremely high leak-tightness, particularly to water or other liquid materials.

Figure 6:
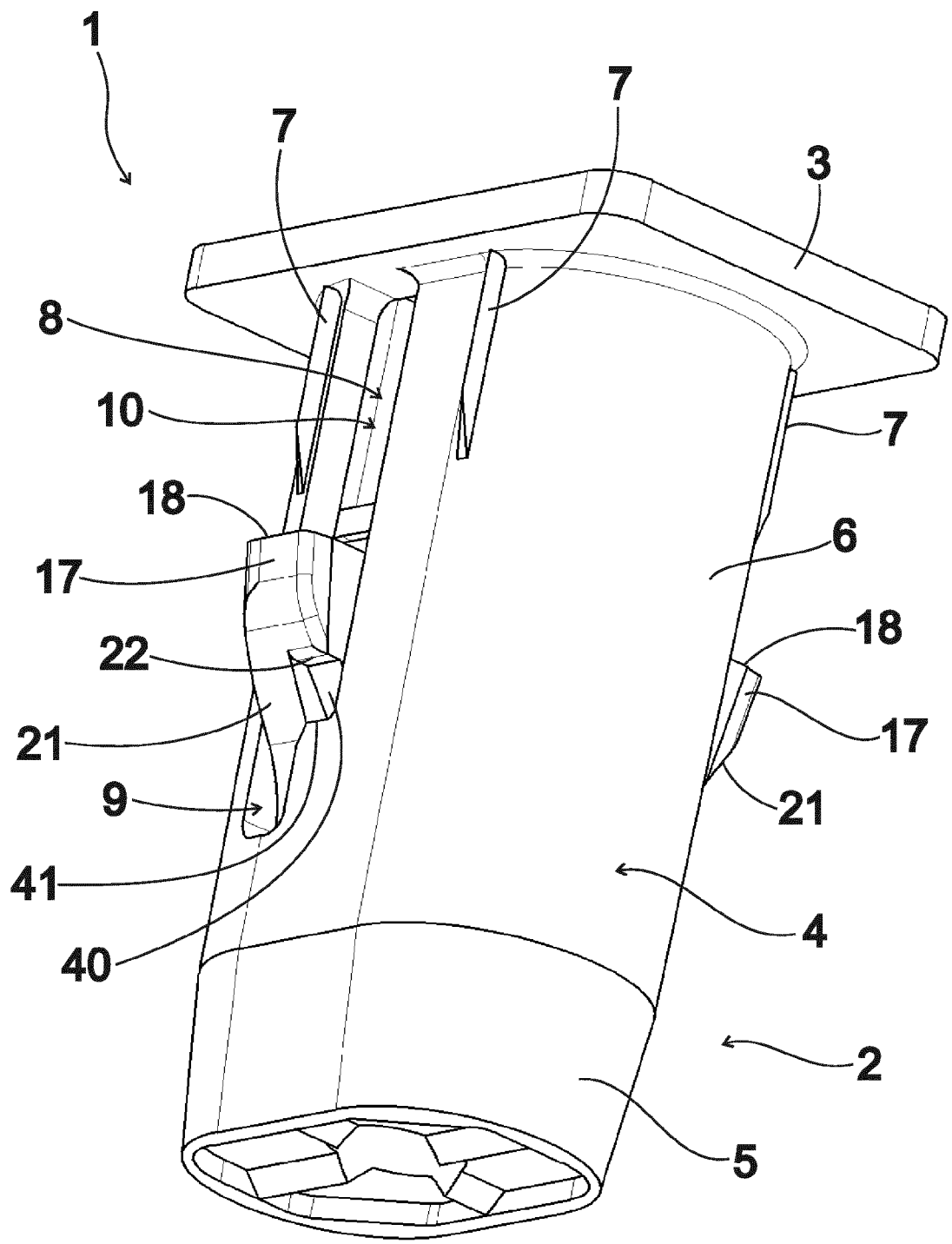
FIG. 6 is a perspective view of a further exemplary embodiment of a plug-in nut according to the invention, having an outer body and an inner body that is pushed into the outer body to a final position.

FIG. 6 is a perspective view of a further exemplary embodiment of a plug-in nut 1 according to the invention, it being noted that, to avoid repetition, mutually corresponding elements of the exemplary embodiment according to FIG. 1 and the exemplary embodiment according to FIG. 6 are provided with the same reference numerals and will not all be described in more detail below. The foot shaft 4 of the exemplary embodiment according to FIG. 6 is formed as oval-shaped. It can also be understood from FIG. 6 that in the exemplary embodiment according to FIG. 6 the rear-locking catch lugs 17 each have an oblique surface 40 that is offset in the radial direction from the particular ramp face 21, and that extends radially inwardly from the respective boundary surface 22. Facing the oblique surfaces 40 in both the axial and the radial direction, the outer body 2 has a ramp edge 41 extending in the circumferential direction, disposed in the region of those ends of the end portions 9 of the receiving slots 8 which are proximate the support plate 3.

Figure 7:
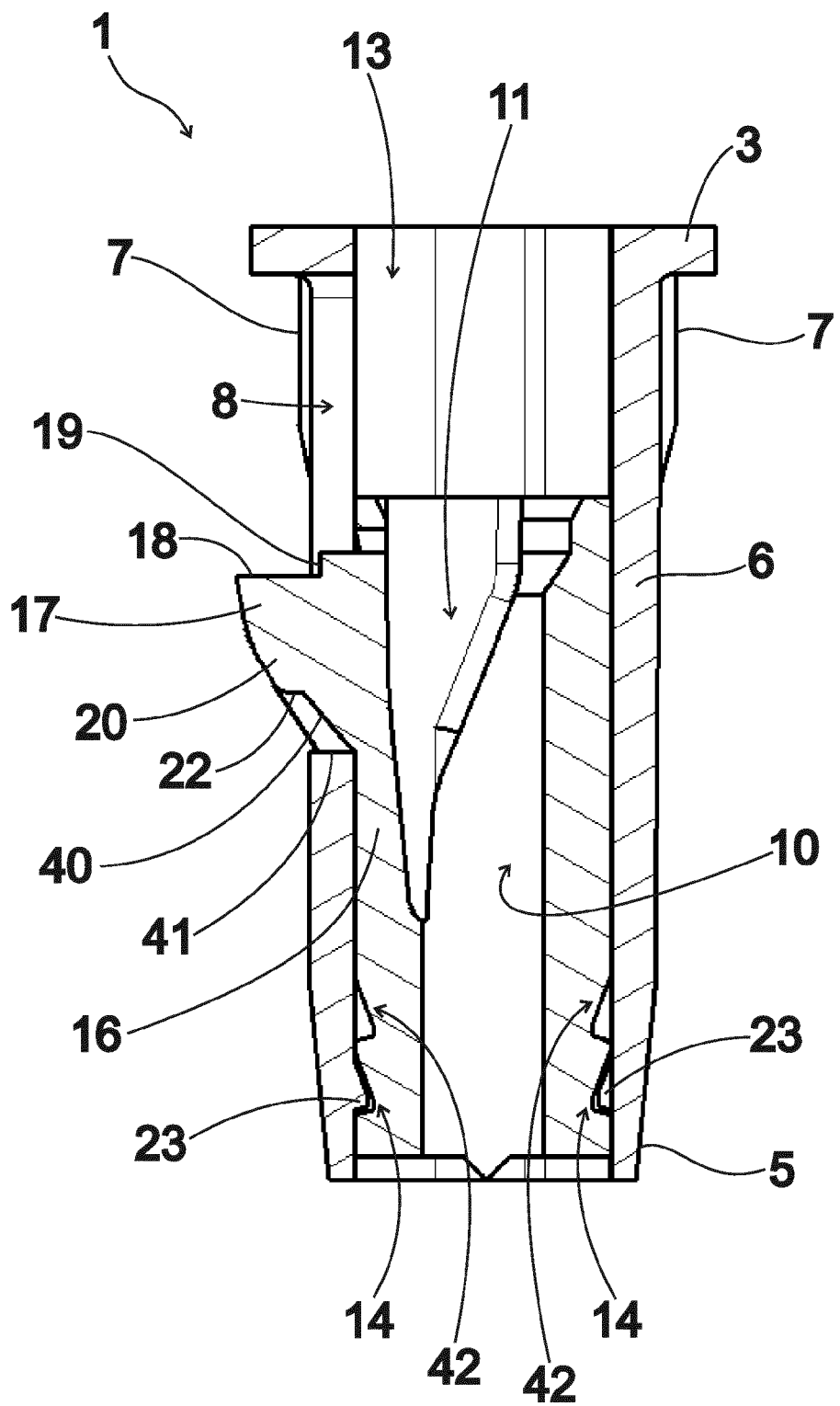
FIG. 7 is a longitudinal section of the further exemplary embodiment according to FIG. 6 with the inner body arranged in the final position.

FIG. 7 is a longitudinal section of the exemplary embodiment according to FIG. 6 with the inner body 10 in the final position. It is evident from FIG. 7 that in the final position, the ramp edge 41 of each rear-locking catch lug 17 abuts the inner body 10 at the end of oblique surface 40 remote from the boundary surface 22, in which arrangement the rear-locking catch lugs 17 nevertheless protrude radially outward to the maximum extent. It can further be understood from the representation according to FIG. 7 that the inner body 10 has, on the side of the fixing recesses 14 facing toward the latching lugs 17, locking recesses 42 whose shape is complementary to that of the fixing projections 23.

Figure 8:
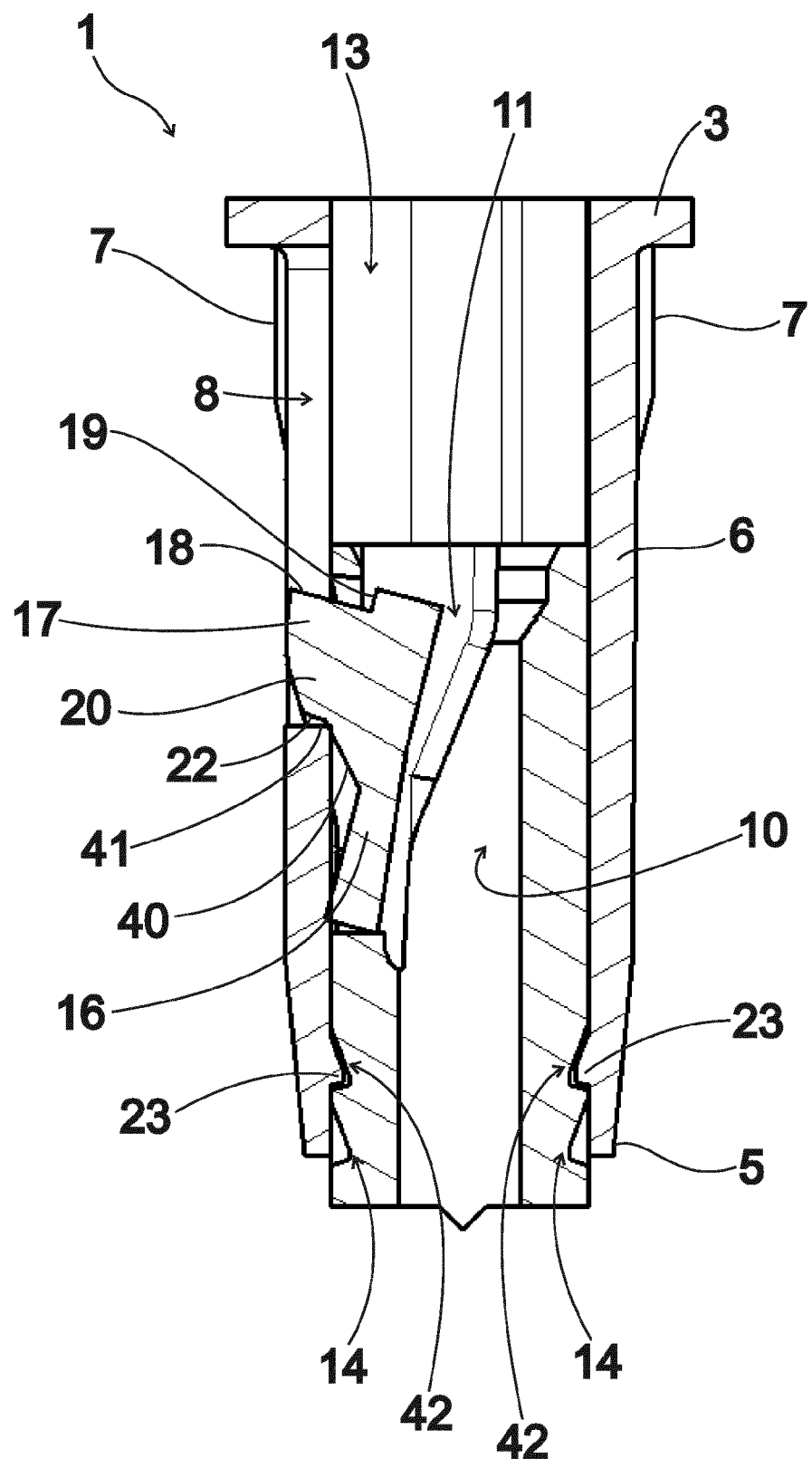
FIG. 8 is a longitudinal section of the further exemplary embodiment according to FIG. 6 with an inner body pushed into the outer body to a removal position.

FIG. 8 is a longitudinal section of the further exemplary embodiment according to FIG. 6 with the inner body 10 pushed into the outer body 2, in the axial direction of the plug-in nut 1, past the final position illustrated in FIG. 7 until the locking recesses 42 engage with the fixing projections 23. When the inner body 10 is moved from the final position according to FIG. 7 into the locked position according to FIG. 8, the oblique surfaces 40, after overcoming a certain resistance, slide over the ramp edges 41. The boundary surfaces 22 form a stop for this movement. In the locked position, therefore, the inner body 10 is fixed with its rear-locking catch lugs 17 deflected radially inward, so that the plug-in nut 1 can be removed.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A plug in nut, comprising:
a support plate:
an outer body provided with receiving slots;
an inner body rotationally fixedly mounted in the outer body and longitudinally displaceable within the outer body over a displacement path, the inner body provided with a screw receiving space, the inner body further configured with rear-locking catch lugs that protrude radially outward beyond the outer body and which, in a final mounting arrangement are disposed in the receiving slots of the outer body, each rear-locking catch lug formed on a spring arm that is flexible in a radial direction and disposed in a respective receiving slot over the entire displacement path; and
wherein each rear-locking catch lug further includes a wedge-shaped rib that points toward an edge portion and, in a final position wherein the inner body is pushed into the outer body, is disposed in a narrow end portion of the respective receiving slot.

2. The plug-in nut of claim 1, wherein each rear-locking catch lug includes a radially outward facing radial stop face.

3. The plug-in nut of claim 1, wherein the outer body and the inner body include engaging means that cooperate with one another when the inner body is in a final position wherein the inner body is pushed into the outer body, said engaging means fixing the inner body with a preliminary mounting force.

4. The plug-in nut of claim 3, wherein the engaging means include fixing recesses and fixing projections that engage in the fixing recesses during said cooperation.

5. The plug-in nut of claim 1, wherein the outer body and the inner body have mutual non-circular form-locking cross sections.

6. The plug-in nut of claim 1, wherein said outer body includes a plurality of radially outwardly protruding compensating ribs.

7. The plug-in nut of claim 1, wherein the support plate is surrounded, on a flat side thereof facing away from a foot shaft and on its radially outwardly disposed edge side, by a top cover made of a soft-elastic material.

8. The plug-in nut of claim 7, wherein the top cover includes, on a radial outer side of the top cover, an inner portion extending inwardly and which, in a relaxed arrangement of the top cover, extends in the axial direction past the support plate.

9. The plug-in nut of claim 7, wherein the top cover is a separate component that is mountable on the support plate.

10. The plug-in nut of claim 1, wherein each rear-locking catch lug includes a ramp edge and the outer body includes locking recesses each assigned to a respective ramp edge and which, in a locked position of the inner body relative to the outer body, cause the rear-locking catch lugs to deflect radially inwardly.

* * * * *